(12) United States Patent
Wang et al.

(10) Patent No.: US 8,015,014 B2
(45) Date of Patent: Sep. 6, 2011

(54) SPEECH RECOGNITION SYSTEM WITH USER PROFILES MANAGEMENT COMPONENT

(75) Inventors: Gang Wang, Goleta, CA (US); Matteo Contolini, Santa Barbara, CA (US); Chengyi Zheng, Goleta, CA (US); Heinz-Werner Stiller, Jestetten (DE)

(73) Assignee: Storz Endoskop Produktions GmbH (DE)

( * ) Notice: Subject to any disclaimer, the term of this patent is extended or adjusted under 35 U.S.C. 154(b) by 1482 days.

(21) Appl. No.: 11/455,248

(22) Filed: Jun. 16, 2006

(65) Prior Publication Data

US 2007/0294081 A1    Dec. 20, 2007

(51) Int. Cl.
*G10L 21/00* (2006.01)
(52) U.S. Cl. ................................................ 704/275
(58) Field of Classification Search ............... 704/270.1, 704/275
See application file for complete search history.

(56) References Cited

U.S. PATENT DOCUMENTS

| | | | |
|---|---|---|---|
| 5,970,457 A | 10/1999 | Brant et al. | 704/275 |
| 6,266,635 B1 | 7/2001 | Sneh | 704/235 |
| 6,278,975 B1 | 8/2001 | Brant et al. | 704/275 |
| 6,400,806 B1 * | 6/2002 | Uppaluru | 379/88.02 |
| 6,462,500 B1 * | 10/2002 | L'Hegarat et al. | 318/649 |
| 6,463,361 B1 | 10/2002 | Wang et al. | 700/258 |
| 6,587,818 B2 | 7/2003 | Kanevsky et al. | 704/251 |
| 6,591,239 B1 | 7/2003 | McCall et al. | 704/275 |
| 6,601,026 B2 | 7/2003 | Appelt et al. | 704/9 |
| 6,642,836 B1 | 11/2003 | Wang et al. | 340/3.54 |
| 6,993,119 B1 * | 1/2006 | Zhang et al. | 379/88.01 |
| 7,117,159 B1 * | 10/2006 | Packingham et al. | 704/275 |
| 7,693,720 B2 * | 4/2010 | Kennewick et al. | 704/275 |
| 2001/0032085 A1 * | 10/2001 | Goedeke et al. | 704/275 |
| 2002/0183894 A1 | 12/2002 | Wang et al. | 700/245 |
| 2003/0194210 A1 | 10/2003 | Shiiyama | |
| 2003/0197590 A1 | 10/2003 | Wang et al. | 340/3.54 |
| 2004/0124964 A1 | 7/2004 | Wang et al. | 340/3.54 |
| 2004/0172011 A1 | 9/2004 | Wang et al. | 606/1 |
| 2005/0100142 A1 * | 5/2005 | Gandhi et al. | 379/88.01 |
| 2005/0288930 A1 * | 12/2005 | Shaw et al. | 704/257 |
| 2007/0050191 A1 * | 3/2007 | Weider et al. | 704/275 |
| 2007/0219792 A1 * | 9/2007 | Normandin | 704/239 |

FOREIGN PATENT DOCUMENTS

| | | |
|---|---|---|
| JP | 2000305596 A | 11/2000 |
| WO | 2005042314 A1 | 5/2005 |
| WO | 2005074634 A2 | 8/2005 |

OTHER PUBLICATIONS

European Search Report, Jul. 13, 2007, 8 pages.

* cited by examiner

*Primary Examiner* — Michael N Opsasnick
(74) *Attorney, Agent, or Firm* — St. Onge Steward Johnston & Reens LLC

(57) ABSTRACT

A speech recognition and control system continuously operable by two or more users. The system includes a receiver for receiving a speech input, a processor in communication with the receiver and a database in communication with the processor. The database includes user profiles. The system also includes profile management software executing on the processor for determining an active profile from the plurality of user profiles, and software executing on the processor for identifying at least one command from the speech input based on the active profile.

20 Claims, 5 Drawing Sheets

SPEECH RECOGNITION SYSTEM WITH USER PROFILES MANAGEMENT COMPONENT

FIELD OF THE INVENTION

The invention relates to speech recognition systems, and more specifically to a speech recognition and device control system including a user profile management component and method for hot-swapping user profiles during runtime.

BACKGROUND OF THE INVENTION

Speech recognition is the process by which an acoustic signal received by microphone is converted to a set of text words, numbers, or symbols by a computer. These recognized words then can be used in a variety of computer software applications for purposes such as document preparation, data entry, and command and control. For example, speech recognition systems may be used in modern operating rooms to control various medical systems and devices. A surgeon or other user, by giving a simple voice command, may direct the functionality of a device controlled by the speech recognition system. For example, the surgeon may deliver a voice command to adjust a patient table or adjust the pressure of a pump.

To enable speech recognition in an operating room, medical devices and/or other equipment are connected with a component (e.g., a call system) through communication channels (e.g., an Ethernet connection, device bus, etc.). A speech recognition system is also connected providing of the connected devices, the system will send an appropriate signal so that the desired control action is taken.

Speech recognition systems are generally customizable for a particular user. For example, a user may customize particular settings of the system. A user may further configure or train the system to recognize his or her particular voice and custom commands. Customization and configuration is performed at the time of initializing the system or upon restarting the system. As such, prior art systems are not customizable or reconfigurable during use and without interruption. Therefore when a second user desires to operate the system, the system must rebooted and/or restarted to reconfigure the system for the second user. In an operating room setting where time is critical, such delay is highly undesirable.

It is therefore desired to provide a speech recognition system and method including an improved means of user customization and configuration. It is further desired to provide a speech recognition system and method operable by two or more users continuously.

SUMMARY OF THE INVENTION

According, it is an object of the present invention to provide a speech recognition and control system having a user profile management system.

It is a further object to provide a speech recognition and control system continuously operable by two or more users and having a quick, smooth, and failsafe means to change user profiles during use.

These and other objectives are achieved by providing a speech recognition and control system continuously operable by two or more users, including a receiver for receiving a speech input, a processor in communication with the receiver, a database in communication with the processor, the database including a plurality of user profiles, profile management software executing on the processor for determining an active profile from the plurality of user profiles, and software executing on the processor for identifying at least one command from the speech input based on the active profile. In one embodiment, the profile management software switches the active profile from a first one of the plurality of user profiles to a second one of the plurality of user profiles upon receiving a profile selection indicative of the second one of the plurality of profiles. The profile management software may switch the active profile during runtime of the speech recognition system.

Further provided is a method of recognizing and implementing spoken commands in a voice-driven device control system including the steps of determining an active profile from one of a plurality of user profiles, receiving a speech input, recognizing at least one command from the speech input based on the active profile; and implementing the at least one command. The step of determining an active profile may include receiving a user selection indicative of a user profile and activating the user profile without restarting, rebooting and/or resetting the voice-driven device control system.

Also provided is a method of switching users of a speech recognition system during runtime, including the steps of receiving a user selection, determining a user profile corresponding to the user selection, comparing the user profile to an active profile to determine conflicts between the user profile and the active profile, and activating the user profile if no conflicts exist between the user profile and the active profile. The method may include an additional step of generating a notification indicative of a conflict or a new active profile.

DETAILED DESCRIPTION OF THE INVENTION

Figure 1:
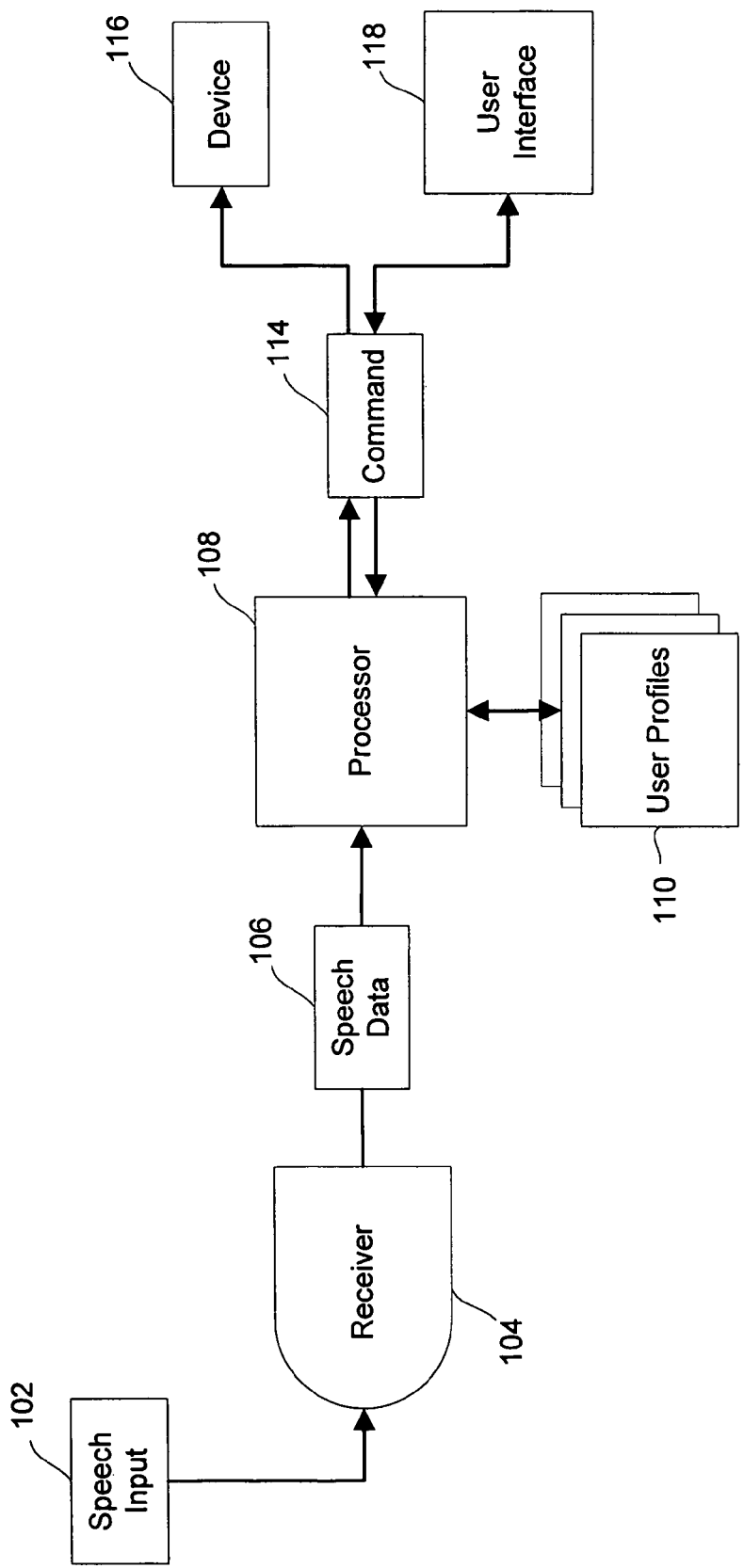
FIG. 1 is a schematic diagram of a system according to the present invention.

FIG. 1 shows a speech recognition and device control system according to the present invention. The system may be useful for any number of applications including, for example, control of devices and/or processes in a medical operating room. The system may further be useful for any number of industrial and/or scientific applications. As will be described, the system according to the present invention is continuously operable by two or more users.

The system includes one or more receivers 104 for receiving speech input 102. The receiver 104 may be any instrument or device for receiving an incoming sound or sound wave and converting it into a digital waveform and/or an electric current or electric energy (e.g., speech data 106). For example, the receiver 104 may be a microphone. The speech input 102 received by the receiver 104 may be any spoken utterance from a user such as a spoken word or phrase, or a collection of words or phrases. The speech input 102 preferably includes words or phrases indicative of one or more commands which a user desires to be communicated to and/or implemented by the system.

The system further includes one or more processors 108. The processor 108 may be any device, system, or part thereof that controls at least one operation or receives and/or execute one or more software programs. The processor 108 may, for example, be one of a digital signal processor, a microcontroller, a microprocessor, or a computer programmable logic device. It should be noted that the functionality associated with the processor 108 may be centralized or distributed, whether locally or remotely. The processor 108 is in communication with the receiver 104 and may receive information from the receiver 104, such as the speech data 106. As will be described in detail below, the processor 108 and other components associated therewith may then transmit or otherwise communicate a command 114 to a device 116, user interface 118, or any other system or apparatus in communication with the processor 108.

The system according to the present invention also includes at least one database, storage, and/or data collection including a plurality of user profiles, e.g., 110. Each user profile 110 of the system may include any number of user preferences, settings or parameters pertaining to a particular user's use of the system. For example, a user profile 110 may include a speech recognition profile pertaining to a user. The speech recognition profile may include pronunciation data or any data generated as a result of speech recognition training by the particular user. The speech recognition profile may further include one or more language models, e.g., specific to the particular user or general to all users of the system.

A user profile 110 may further include a display or user interface preferences profile, e.g., including any number of settings or parameters related to the user interface 118. The user profile 110 may also include a device preferences profile including preferences, settings and parameters pertaining to any number of particular devices operable by the system. The user profile 110 may further include a feedback preferences profile identifying the types of feedback the user desires (e.g., notifications, alerts, etc.) and/or the manner in which feedback is desired (e.g., audio, visual, etc). As one of ordinary skill in the art will understand, however, a user profile 110 may include many other preferences, settings, parameters and profiles.

The system further includes any number of devices, such as device 116 shown in FIG. 1. A device 116 may be any device or group of devices operable by the system. For example, the device 116 may be medical device, instrument, tool or system, e.g., in an operating room. The device 116 may further be a scientific or industrial device, instrument, tool or system. Each device 116 may receive commands 114 from the system. Some devices 116 may also provide feedback or other data to the system. The system also includes at least one user interface 118 (e.g., graphical user interface). The user interface 118 may be any device for displaying or otherwise providing information or feedback to a user and/or receiving input or information from the user. For example, the user interface 118 may include any number of components such as a monitor or display, a keypad, keyboard, a touch-screen, a mouse, and/or an audio output. In some embodiments, the user interface 118 further includes the receiver 104.

Figure 2:
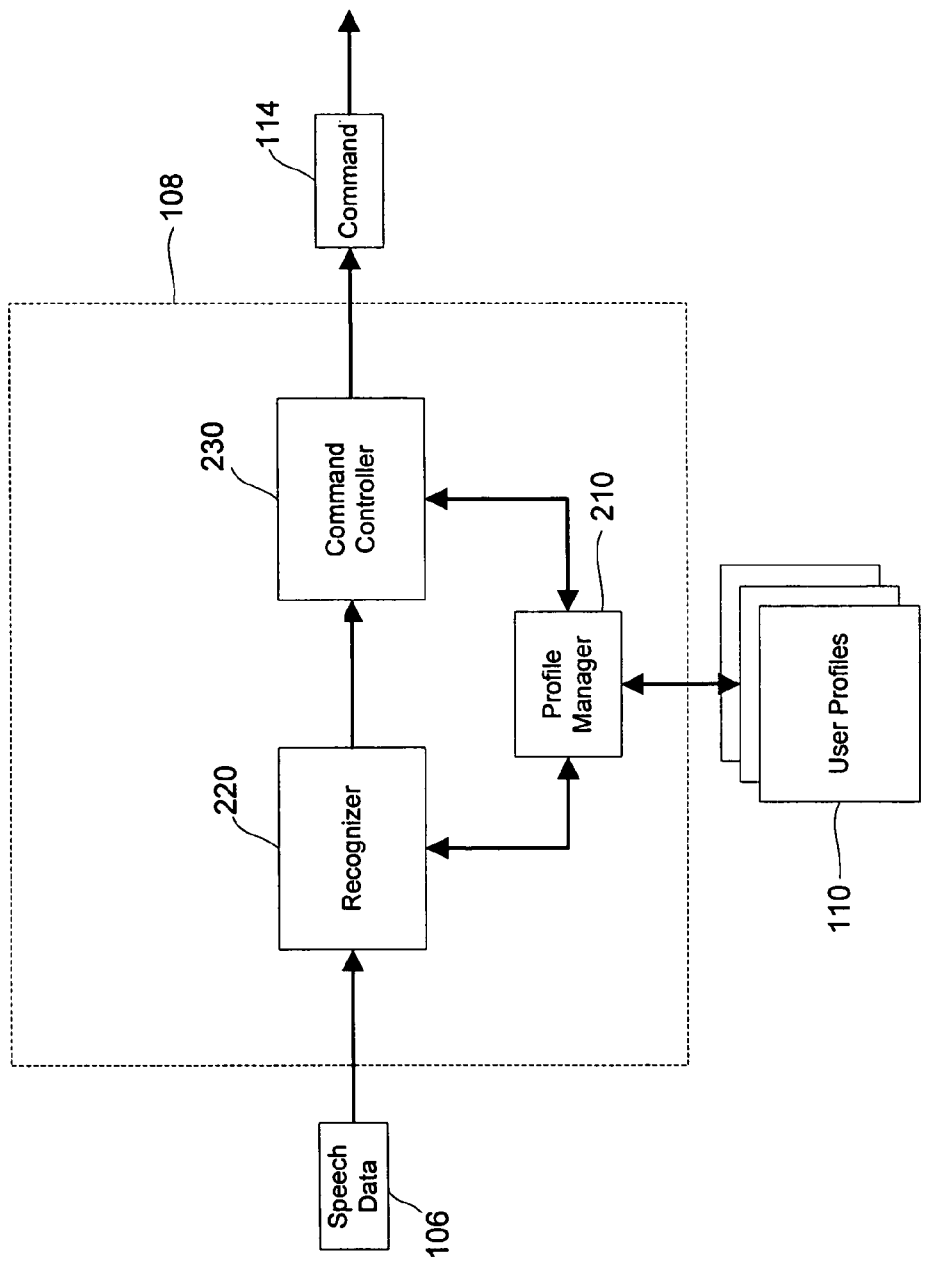
FIG. 2 is a schematic diagram of a processor of the system shown in FIG. 1.

FIG. 2 shows an exemplary processor 108 of the system. The processor 108 includes any number of software applications or processes executing thereon. As one of ordinary skill in the art will understand, the software of the system may be stored or located either local or remote to the processor 108, e.g., in a database and/or temporary memory. As shown, the system includes a profile manager 210 for determining an active profile from the plurality of user profiles 110. The profile manager 210 may be embodied in hardware, software or a combination thereof. For example, the profile manager 210 may include profile management software executing on the processor 108 as shown in FIG. 2.

The system according to the present invention may be used by two or more users (e.g., simultaneously or consecutively). Each of the users may have a user profile 110 accessible by the profile manager 210 and/or processor 108 and identifiable by a unique user identifier. The profile manager 210 provides a means for determining which of the user profiles 110 is the active profile of the system at any given time. The profile manager 210 further provides means for switching the active profile during runtime of the system, e.g., without restarting, rebooting and/or resetting the system and processor 108.

The profile manager 210 may switch the active profile from a first one of the plurality of user profiles (e.g., corresponding to a first one of the present users of the system) to a second one of the plurality of user profiles (e.g., corresponding to a second one of the present users of the system) after receiving a profile selection indicative of the second one of the plurality of profiles. The profile or user selection may be a spoken selection (e.g., speech input 102). For example, a user may speak his or her unique identifier, such as a unique code or the user's name (e.g., "Dr. Smith"), to switch the active profile. A user may also manually select a new active profile via the user interface 118. The selection may further be an automatic selection or switch provided by the system. For example, the system may recognize a new user's voice (e.g., corresponding to a user profile 110) and automatically switch profiles accordingly.

After or upon receiving a profile selection, the profile manager 210 compares the current active profile to the selected profile to determine if any potential conflicts exist prior to switching the active profile. For example, the profile manager 210 may check for any conflicting device preferences or settings pertaining to a device currently in use by the system. The profile manager 210 may further check any number of other settings, preferences, and parameters in each profile to ensure a failsafe and smooth switch and/or transition. If a conflict is found, the profile manager 210 generates an alert or notification to the system's user or users. The alert may be audible or visual. In some cases, the alert may prompt the users for input to resolve the conflict.

If no conflicts or potential conflicts are found, or upon the resolution of a potential conflict, the system may generate a notification of the active profile switch. In one embodiment, the user interface 118 continuously displays the unique identifier corresponding to the active profile. The notification therefore may include changing the display to indicate the unique identifier corresponding to the new active profile. The display may also be accompanied by an audible notification as desired.

Shown in FIG. 2, the system also includes a recognizer 220 for recognizing or identifying at least one potential command (e.g., a word or phrase) or a command 114 from the speech input 102 or speech data 106. The recognizer 220 may be embodied in hardware, software or a combination thereof. For example, the recognizer 220 may include recognizer software executing on the processor 108 as shown in FIG. 2. The recognizer 220 may identify the command 114 based on the active profile. For example, the recognizer 220 may access the active user's speech recognition profile and/or language model and identify a command 114 based at least in part on information contained thereon. The recognizer 220 may further access or employ any number of language models applicable to all users of the system in identifying the potential command or command 114 (not shown).

The system further includes a command controller 230 for implementing the at least one command (e.g., 114) and communicating with any number of devices or systems. The command controller 230 may determine a device associated with the potential command or command 114 identified by the recognizer 220. For example, the command controller 230 may employ information and device preferences contained in the user profile 110. As one of ordinary skill in the art will understand, the command controller 230 may also employ any number of other components, applications and other means in implementing a command. The command controller 230 may then transmit or communicate the command 114 to a device 116 or user interface 118 (shown in FIG. 1).

Figure 3:
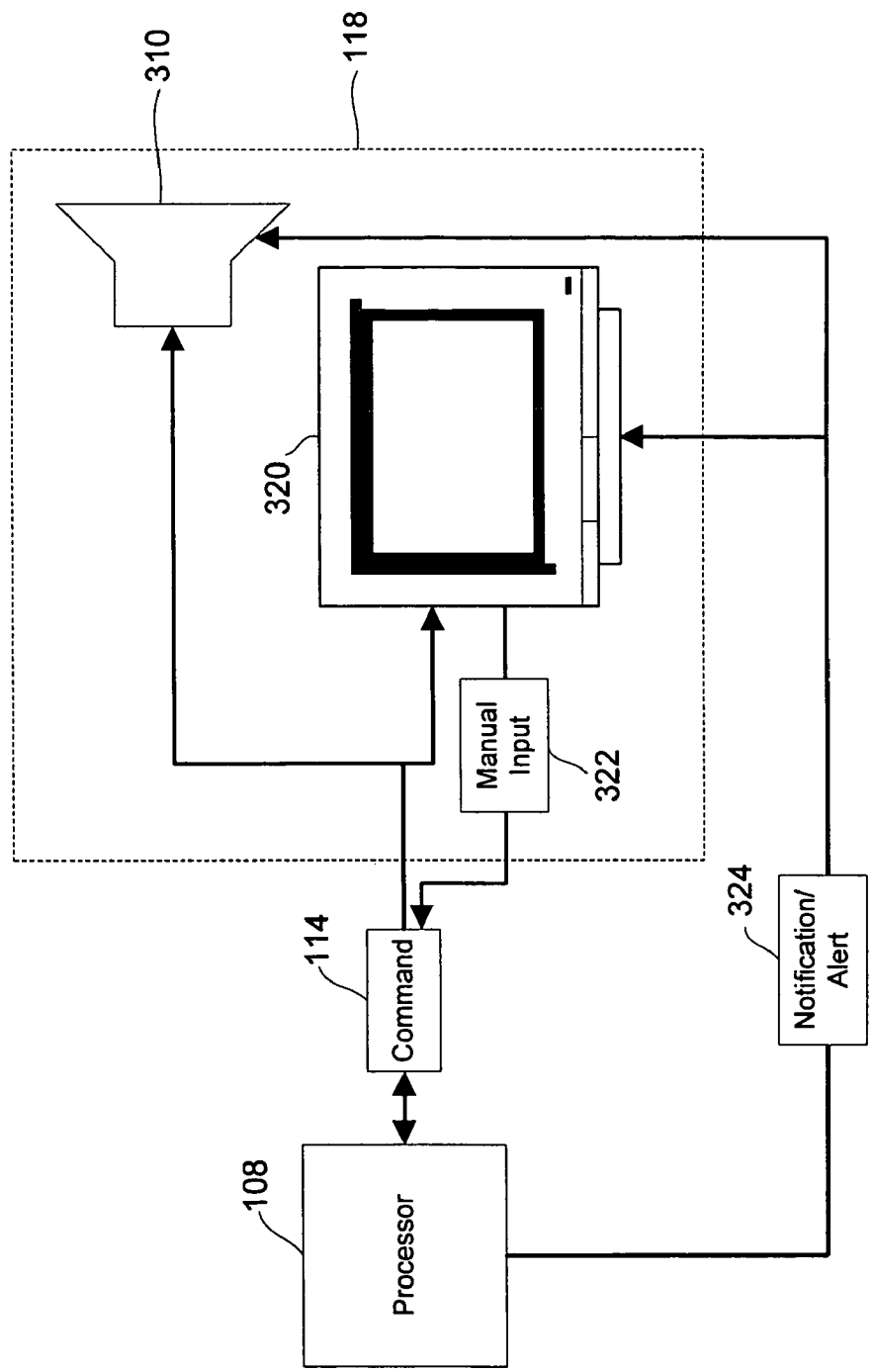
FIG. 3 is a schematic diagram of a user interface of the system shown in FIG. 1.

FIG. 3 shows an exemplary user interface 118. The user interface 118 may include one or more monitors or displays 320. In some embodiments, the display 320 is a touch-screen display enabling a user to make selections or provide manual input 322 to the system by touching or tapping the display 320. The user interface 118 may also include any other means to provide manual input 322 including, but not limited to, a keyboard, keypad, switches, a mouse, or a joystick. The exemplary user interface 118 also includes an audio output 310 or speaker. The audio output 310 may provide users with audio feedback from the system, notifications, alerts, etc. Some embodiments of the user interface 118 also include the receiver 104.

Figure 4:
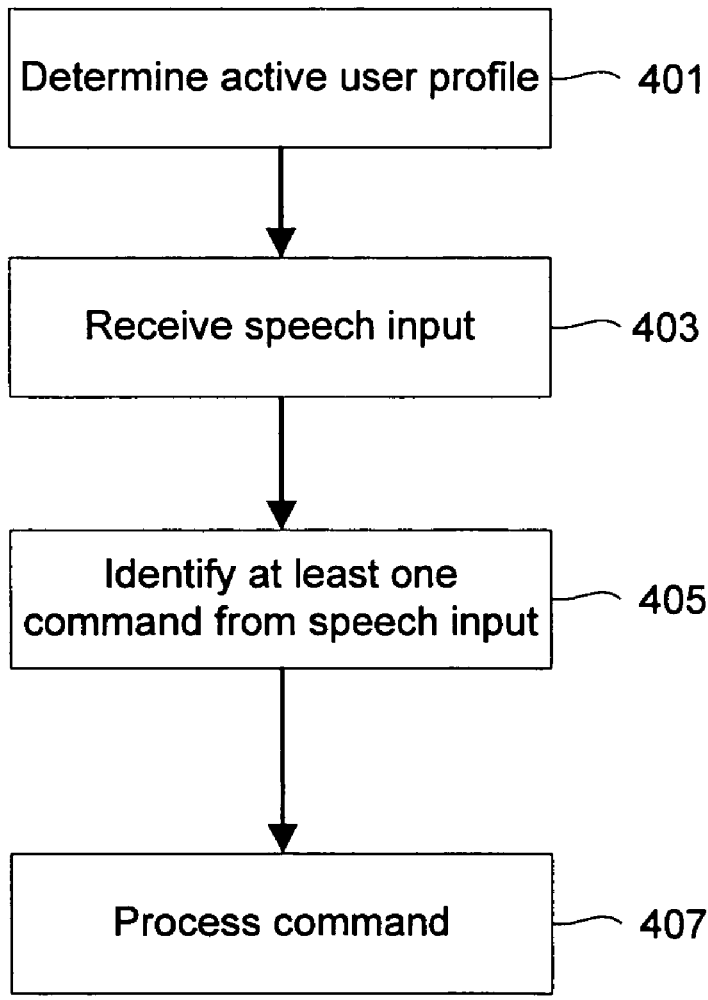
FIG. 4 is a method of recognizing and implementing spoken commands employable by the system shown in FIG. 1.

FIG. 4 shows a method of recognizing and implementing spoken commands employable by the system shown in FIG. 1. The method includes a first step 401 of determining an active profile from one of a plurality of user profiles. The step 401 may be executed by the profile manager 210 of the system. The profile manager 210 may, for example, receive a user selection indicative of a particular user profile (e.g., unique user identifier). Upon receiving the selection, or after completing a conflict check, the profile manager 210 may activate the user profile during runtime and without restarting, rebooting and/or resetting the voice-driven device control system.

The method also includes a step 403 of receiving a speech input. The speech input may be indicative of a command to be implemented by the system or a device operable by the system. The system may then identify or recognize at least one potential command or command from the speech input, e.g., based on information, settings or preferences contained in the active profile (step 405). The command or commands identified by the system may next be processed and implemented (step 407). For example, a command may be implemented by one or more corresponding devices operable by the system.

Figure 5:
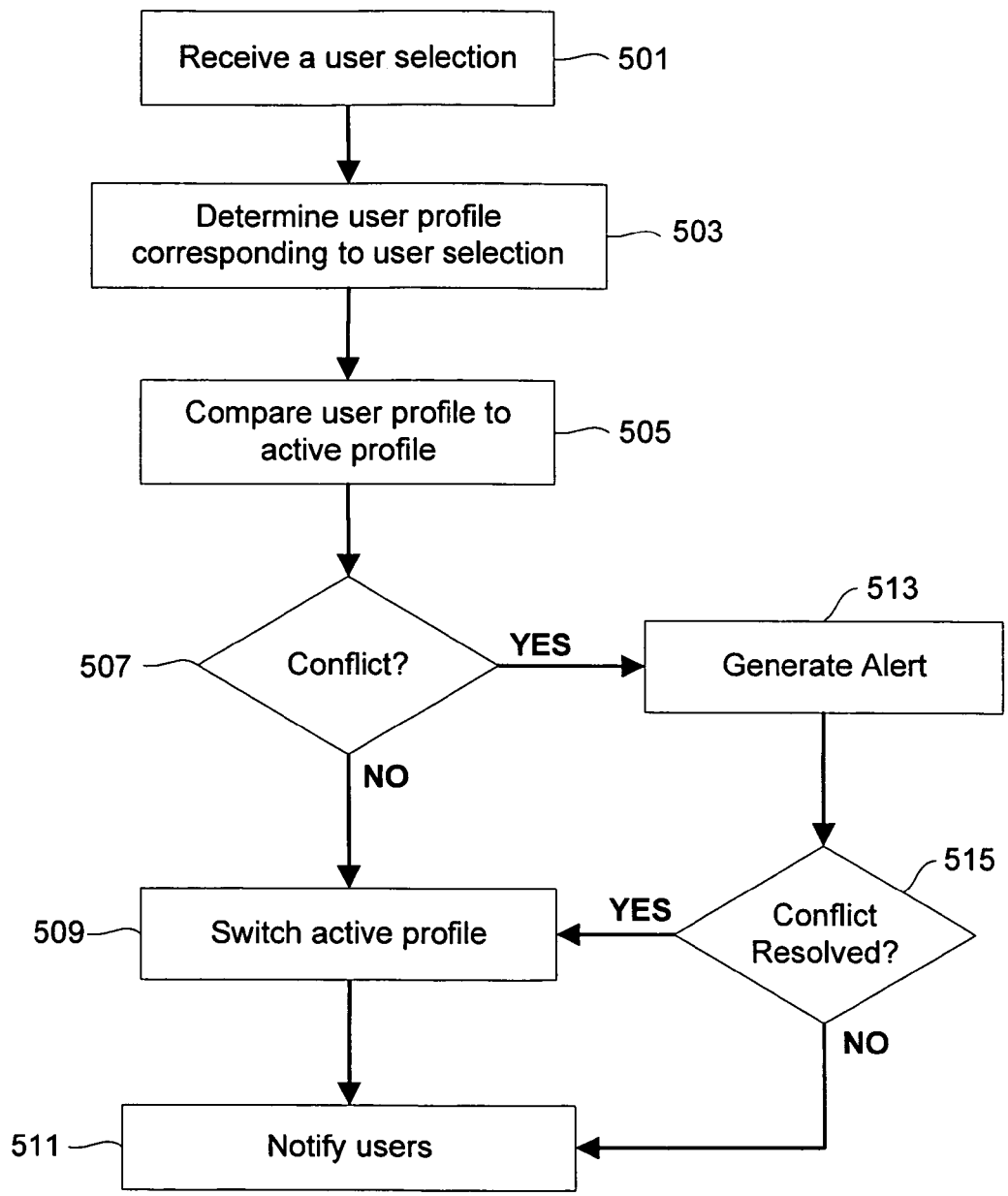
FIG. 5 is a method of switching users during runtime employable by the system shown in FIG. 1.

FIG. 5 shows a method of switching users during runtime employable by system shown in FIG. 1. The method includes a step 501 of receiving a user or profile selection. The selection may be received as a speech input, manual input, an automatic selection (e.g., based on the system's recognition of a particular user's voice), or a combination thereof. The user selection preferably includes a unique user identifier such as a code, name, or any other identifier. A user profile corresponding to the user selection is then determined (step 503). Determining the user profile may include querying the database of user profiles 110. The selected user profile is compared to the current active profile to determine if any conflicts or potential conflicts exist between the user profile and the active profile (steps 505-507). If no conflicts exist, the selected user profile is activated (step 509). The user profile may be activated immediately, or in some embodiments, upon confirmation of the switch by one or both users. A notification of the switch in active profiles is then provided to the users (step 511).

If a conflict or potential conflict is found between the selected profile and active profile, a notification or alert is generated (step 513). The alert may include a request for user input to resolve the conflict. If the conflict is resolved (step 515), the active profile is switched and the users notified (step 511).

Although the invention has been described with reference to a particular arrangement of parts, features and the like, these are not intended to exhaust all possible arrangements or features, and indeed many modifications and variations will be ascertainable to those of skill in the art.

What is claimed is:

1. A speech recognition and control system continuously operable by two or more users, comprising:
   a receiver for receiving a speech input;
   a processor in communication with said receiver;
   a database in communication with said processor, said database including a plurality of user profiles, wherein each of the plurality of user profiles includes a speech recognition profile and one or more user preferences;
   profile management software executing on said processor for determining an active profile from the plurality of user profiles; and
   software executing on said processor for identifying at least one command from the speech input based on the active profile;
   wherein said profile management software, after receiving a profile selection indicative of a second one of the plurality of profiles, compares the active profile to the second profile to determine conflicts between the active and second profiles pertaining to any devices being controlled by the system before switching the active profile to the second one of the plurality of user profiles during runtime of the speech recognition and control system.

2. The system according to claim 1, further comprising:
   software for generating a notification upon switching the active profile.

3. The system according to claim 2, wherein the software for generating a notification generates at least one of an audio notification and a visual notification.

4. The system according to claim 2, wherein the notification includes a user identifier corresponding to the active profile.

5. The system according to claim 1, wherein the profile selection is one of a spoken selection, a manual selection, and an automatic selection.

6. The system according to claim 1, wherein the profile selection includes a unique user identifier.

7. The system according to claim 1, wherein said profile management software generates an alert if a potential conflict is found.

8. The system according to claim 1, wherein the user preferences include at least one of a speech recognition profile, a display preferences profile, a device preferences profile, and a feedback preferences profile.

9. The system according to claim 1, wherein one of the plurality of user profiles is a default profile.

10. The system according to claim 1, wherein one or more of the plurality of user profiles is editable by said profile management software.

11. The system according to claim 1, further comprising:
    software executing on said processor for implementing the at least one command.

12. A speech recognition and control system continuously operable by two or more users, comprising:
    a receiver for receiving a speech input;
    a database including a plurality of user profiles, wherein each of the plurality of user profiles includes a speech recognition profile and one or more user preferences;

a profile manager for determining an active profile from the plurality of user profiles;

a recognizer for identifying at least one potential command from the speech input based on the active profile;

a command controller for determining at least one device command from the at least one potential command and implementing the at least one device command; and wherein said profile management software, after receiving a profile selection indicative of a second one of the plurality of profiles, compares the active profile to the second profile to determine conflicts between the active and second profiles pertaining to any devices being controlled by the system before switching the active profile to the second one of the plurality of user profiles during runtime of the speech recognition and control system.

13. The system according to claim 12, wherein said recognizer determines the particular one of the two or more users providing the speech input based on voice recognition, and wherein said profile manager switches the active profile to one of the plurality of user profiles corresponding to the particular user.

14. A method of recognizing and implementing spoken commands in a voice-driven device control system, comprising the steps of:

determining, via software executing on a processor, an new active profile from one of a plurality of user profiles by receiving a user selection indicative of a user profile, wherein each of the plurality of user profiles includes a speech recognition profile and one or more user preferences;

comparing, via software executing on the processor, the selected user profile to a current active profile to determine conflicts between the selected user profile and the current active profile pertaining to any devices being controlled by the system;

activating the selected user profile without restarting the voice-driven device control system;

receiving a speech input via a receiver;

recognizing, via software executing on the processor, at least one command from the speech input based on the active profile; and implementing, via software executing on the processor, the at least one command.

15. The method according to claim 14, wherein said step of implementing the command includes transmitting the command to at least one device operable by the voice-driven device control system.

16. A method of switching users of a speech recognition and control system during runtime, comprising the steps of:

receiving a user selection indicative of a user profile;

determining, from a plurality of user profiles, the user profile corresponding to the user selection via software executing on a processor;

comparing, via software executing on the processor, the selected user profile to a current active profile to determine conflicts between the selected user profile and the current active profile pertaining to any devices being controlled by the system; and activating, via software executing on the processor, the user profile if no conflicts exist between the selected user profile and the current active profile.

17. The method according to claim 16, further comprising the step of:

generating a notification via software executing on the processor, the notification indicative of one of a conflict and a new active profile.

18. The method according to claim 16, wherein said step of determining a user profile includes querying, via software executing on the processor, a database of a plurality of user profiles.

19. The method according to claim 16, wherein the user selection is received as one of a speech input, a manual selection, and an automatic selection.

20. The method according to claim 16, wherein the user selection includes a unique user identifier.

* * * * *